United States Patent
Erickson et al.

(10) Patent No.: US 10,042,585 B2
(45) Date of Patent: Aug. 7, 2018

(54) PERVASIVE DRIVE OPERATING STATISTICS ON SAS DRIVES

(71) Applicant: Western Digital Technologies, Inc., Irvine, CA (US)

(72) Inventors: Mark David Erickson, Mantorville, MN (US); Darin Edward Gerhart, Oronoco, MN (US); Nicholas Edward Ortmeier, Rochester, MN (US)

(73) Assignee: Western Digital Technologies, Inc., San Jose, CA (US)

( * ) Notice: Subject to any disclaimer, the term of this patent is extended or adjusted under 35 U.S.C. 154(b) by 107 days.

(21) Appl. No.: 15/277,545

(22) Filed: Sep. 27, 2016

(65) Prior Publication Data
US 2018/0088860 A1    Mar. 29, 2018

(51) Int. Cl.
*G06F 3/06* (2006.01)

(52) U.S. Cl.
CPC ............ *G06F 3/0655* (2013.01); *G06F 3/061* (2013.01); *G06F 3/0653* (2013.01); *G06F 3/0673* (2013.01)

(58) Field of Classification Search
CPC ...... G06F 3/0655; G06F 3/061; G06F 3/0653; G06F 3/0673
USPC .................................................. 711/170, 156
See application file for complete search history.

(56) References Cited

U.S. PATENT DOCUMENTS

| | | | |
|---|---|---|---|
| 6,408,406 B1 | 6/2002 | Parris | |
| 8,918,583 B2 | 12/2014 | Hoang et al. | |
| 9,047,068 B2 | 6/2015 | Pereira | |
| 9,195,409 B2 | 11/2015 | Mills et al. | |
| 9,229,796 B1* | 1/2016 | Ma | G06F 11/008 |
| 2007/0260811 A1 | 11/2007 | Merry, Jr. et al. | |
| 2012/0260138 A1 | 10/2012 | Downing, III et al. | |
| 2012/0265962 A1* | 10/2012 | Peled | G11B 5/09 |
| | | | 711/204 |
| 2013/0174176 A1 | 7/2013 | Kopylovitz | |
| 2013/0179624 A1 | 7/2013 | Lambert et al. | |
| 2015/0006094 A1* | 1/2015 | Orr | H02J 3/383 |
| | | | 702/58 |
| 2017/0177262 A1* | 6/2017 | Sharma | G06F 3/0634 |

OTHER PUBLICATIONS

Seagate Technology LLC, Serial Attached SCSI (SAS) Interface Manual, Publication 100293071, Rev. B, May 2006, 131 pgs.
Seagate Technology LLC, SCSI Commands Reference Manual, Parallel SCSI, Fibre Channel (FC), Serial Attached SCSI (SAS), Publication 100293068, Rev. A, Feb. 2006, 362 pgs.

* cited by examiner

*Primary Examiner* — Pierre Michel Bataille
(74) *Attorney, Agent, or Firm* — Foley & Lardner LLP

(57) ABSTRACT

A method is described that includes generating, by a controller of a storage device, operating statistics associated with an operating state of the storage device. The method includes receiving, by the controller and from a host device, a non-interrupt command frame that requests transfer of data blocks between the storage device and the host device. The method further includes, in response to receiving the non-interrupt command frame, generating, by the controller, a response frame associated with the non-interrupt command frame, wherein the response frame includes the operating statistics. The method includes transmitting, by the controller and to the host device, the response frame.

17 Claims, 5 Drawing Sheets

US 10,042,585 B2

PERVASIVE DRIVE OPERATING STATISTICS ON SAS DRIVES

TECHNICAL FIELD

The disclosure generally relates to storage devices.

BACKGROUND

Disk drives and other sorts of devices are typically connected to a host computer through a host interface connector for the transfer of commands, status and data. For example, the host computer accesses the disk drive and reads data from the disk drive and/or saves data to the disk drive. The host computer can be connected to an external storage device, such as a hard disk drive, by a parallel interface, or in more recent examples, by a serial interface. Examples of a serial standard include the Serial Advanced Technology Attachment (SATA) standard and the Serial Attached SCSI (SAS) standard.

Many host devices have features or system-level dependencies that require information on the current operating state of a storage device. Some host devices use a type of device interface that support a "side-band" or "out-of-band" form of access to such information, such as, devices implementing the Fibre Channel Arbitrated Loop (FC-AL) interface over an Enclosure Services Interface (ESI). Other host devices can retrieve such information by periodically polling the storage device, which actively maintains the information. For example, with a storage device supporting the SAS standard, the host device can issue commands to the storage device over the SAS interface to retrieve this information, for example, issuing log retrieval commands (e.g., "log sense") to various log pages of the storage device that store the information and other log data.

SUMMARY

In one example, a method includes generating, by a controller of a storage device, operating statistics associated with an operating state of the storage device. The method further includes receiving, by the controller and from a host device, a non-interrupt command frame that requests transfer of data blocks between the storage device and the host device, and in response to receiving the non-interrupt command frame, generating a response frame associated with the non-interrupt command frame, wherein the response frame includes the operating statistics. The method includes transmitting, by the controller and to the host device, the response frame.

In another example, a storage device includes a memory device and a controller. The controller is configured to generate operating statistics associated with an operating state of the storage device, and receive, from a host device, a non-interrupt command frame that requests transfer of data blocks between the storage device and the host device. The controller is further configured to, in response to receiving the non-interrupt command frame, generate a response frame associated with the non-interrupt command frame, wherein the response frame includes the operating statistics, and transmit, to the host device, the response frame.

In another example, a method includes transmitting, by a host device and to a storage device, a non-interrupt command frame that requests transfer of data blocks between the storage device and the host device. The method further includes receiving, by the host device and from the storage device, a response frame associated with the non-interrupt command frame, and extracting, by the host device, operating statistics associated with an operating state of the storage device embedded in the response frame.

The details of one or more examples are set forth in the accompanying drawings and the description below. Other features, objects, and advantages will be apparent from the description and drawings, and from the claims.

DETAILED DESCRIPTION

Figure 1:
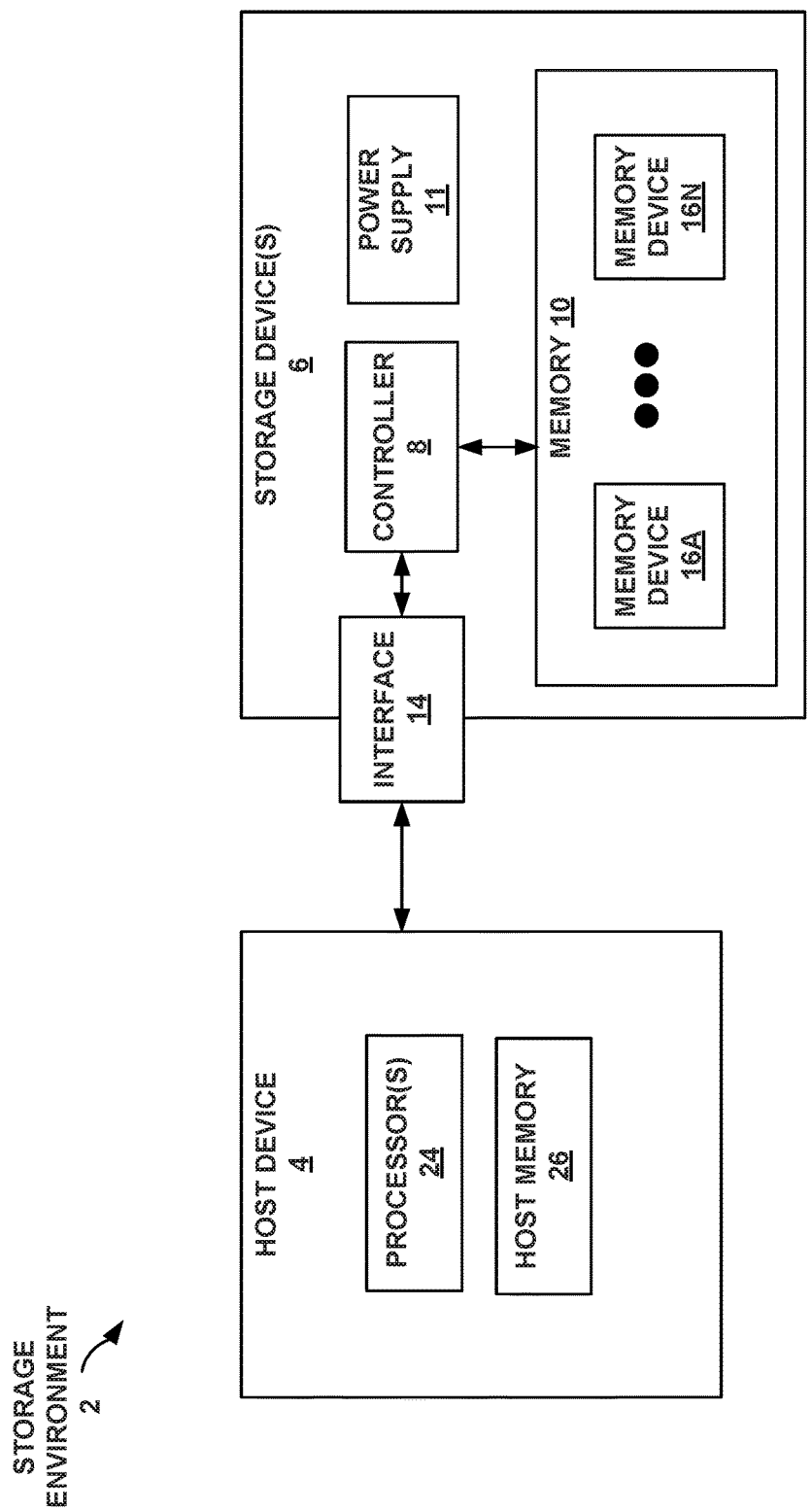
FIG. 1 is a conceptual and schematic block diagram illustrating an example storage environment in which a storage device may interact with a host device, in accordance with one or more techniques of this disclosure.

In general, this disclosure describes techniques for obtaining operating statistics from a storage device, such as a solid state drive (SSD) or hard disk drive (HDD), using response frames returned to a host device in response to the host device's commands. As mentioned above, some host devices can retrieve operating statistics by expressly polling the storage device with log retrieval commands (e.g., "log sense" for SAS devices) to retrieve log data from various log pages of the storage device. However, the frequency of issuing such log retrieval commands can have a direct impact on the performance of the storage device. For example, common log retrieval commands can cause a storage device to suspend drive operations during generation of the log retrieval response to ensure that the returned set of log information is static from the perspective of the storage device, which disrupts the performance of read and write operations and other internal storage device operations. Otherwise, if a storage device had any read or write operations in flight at the time of request, the storage device might return log information that is partially affected by the operations (i.e., having log data that is part pre-command execution and part post-command execution). In some storage devices, log retrieval commands are not typically implemented as performance-sensitive commands. Further, the latency impact from log retrieval commands is dependent upon the specific device implementation. Thus, log retrieval commands may impart performance penalties to storage device operations.

In some examples, a host device may communicate with a storage device using a serial interface, such as a Serial Attached SCSI (SAS) interface, which is a point-to-point serial protocol for moving data to and from the storage device. Using a SAS interface, the host device may act as an "initiator" that originates SCSI commands (e.g., device service and task management requests) to be processed by the "target" storage device. The target storage device contains logical units and target ports that receive the SCSI commands, direct the commands to one or more logical units for execution, and return responses to the commands to the initiator device. Interfaces such as SAS interfaces lack a "side-band" access to operating state information that might be available in other interfaces such as a System Management Bus (SMBus) on an NVMe™ interface, or Enclosure Services Interface (ESI) on FC-AL interface.

In accordance with techniques of this disclosure, the host device may configure the storage device to embed operating statistics maintained by the storage device within response frames returned to the host device. The storage device may be configured to embed one or more types of operating statistics within one or more fields of the response frame. The storage device may be configured to dynamically update and maintain one or more operating statistics, such as those related to the temperature, endurance, and power values of the storage device. In some implementations, the storage device may include an interlocking mechanism that allows for atomic updates to response frame content, thereby preventing cases of the hardware of the storage device populating a response frame with partially updated information (e.g., operating statistics). Using techniques of this disclosure, the host device can obtain operating statistics without issuing dedicated log commands to retrieve drive operating statistics from the storage device, which may temporarily stall or suspend operations (e.g., outstanding read/write commands) of the storage device during the execution of the log retrieval command. As such, the techniques of this disclosure provide a mechanism for the host device to directly gather real-time drive operating statistics with less or substantially no impact on the storage device's performance, resulting in lower latency and faster processing in the storage device. A host device configured according to the described techniques may obtain operating state information in a way that avoids the need to issue special-purpose commands or invest in a proprietary interface to retrieve this information.

FIG. 1 is a conceptual and schematic block diagram illustrating an example storage environment 2 in which storage device 6 may function as a storage device for host device 4, in accordance with one or more techniques of this disclosure. For instance, host device 4 which may store data to and/or retrieve data from one or more storage devices 6. In some examples, storage environment 2 may include a plurality of storage devices, such as storage device 6, which may operate as a storage array. For instance, storage environment 2 may include a plurality of storages devices 6 configured as a redundant array of inexpensive/independent disks (RAID) that collectively function as a mass storage device for host device 4.

Host device 4 may include any computing device, including, for example, a computer server, a network attached storage (NAS) unit, a desktop computer, a notebook (e.g., laptop) computer, a tablet computer, a set-top box, a mobile computing device such as a "smart" phone, a television, a camera, a display device, a digital media player, a video gaming console, a video streaming device, or the like. Host device 4 may include at least one processor 24 and host memory 26. At least one processor 24 may include any form of hardware capable of processing data and may include a general purpose processing unit (such as a central processing unit (CPU)), dedicated hardware (such as an application specific integrated circuit (ASIC)), configurable hardware (such as a field programmable gate array (FPGA)), or any other form of processing unit configured by way of software instructions, microcode, firmware, or the like. Host memory 26 may be used by host device 4 to store information (e.g., temporarily store information). In some examples, host memory 26 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like).

As illustrated in FIG. 1, storage device 6 may include controller 8, memory 10, power supply 11, and interface 14. In some examples, storage device 6 may include additional components not shown in FIG. 1 for sake of clarity. For example, storage device 6 may include a printed circuit board (PCB) to which components of storage device 6 are mechanically attached and which includes electrically conductive traces that electrically interconnect components of storage device 6, or the like. In some examples, the physical dimensions and connector configurations of storage device 6 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.), M.2, or the like. In some examples, storage device 6 may be directly coupled (e.g., directly soldered) to a motherboard of host device 4.

Storage device 6 may include interface 14 for interfacing with host device 4. Interface 14 may include one or both of a data bus for exchanging data with host device 4 and a control bus for exchanging commands with host device 4. Interface 14 may operate in accordance with any suitable protocol. For example, as described in more detail with reference to FIG. 2-5, interface 14 may operate according to a serially attached SCSI (SAS) protocol. However, in other examples, the techniques of this disclosure may apply to an interface 14 that operates in accordance with one or more of the following protocols: advanced technology attachment (ATA) (e.g., serial-ATA (SATA), and parallel-ATA (PATA)), Fibre Channel Arbitrated Loop (FCAL), small computer system interface (SCSI), Non-Volatile Memory Express (NVMe™), peripheral component interconnect (PCI), PCI-express, or the like. The interface 14 (e.g., the data bus, the control bus, or both) is electrically connected to controller 8, providing a communication channel between host device 4 and controller 8, allowing data to be exchanged between host device 4 and controller 8. In some examples, the electrical connection of interface 14 may also permit storage device 6 to receive power from host device 4.

Storage device 6 may include power supply 11, which may provide power to one or more components of storage device 6. When operating in a standard mode, power supply 11 may provide power to the one or more components using power provided by an external device, such as host device 4. For instance, power supply 11 may provide power to the one or more components using power received from host device 4 via interface 14. In some examples, power supply 11 may include one or more power storage components configured to provide power to the one or more components when operating in a shutdown mode, such as where power ceases to be received from the external device. In this way, power supply 11 may function as an onboard backup power source. Some examples of the one or more power storage components include, but are not limited to, capacitors, super capacitors, batteries, and the like.

Storage device 6 includes memory 10, which includes a plurality of memory devices 16A-16N (collectively, "memory devices 16"). Memory devices 16 of memory 10 may be volatile memory, non-volatile memory, or a combination of both. Each of memory devices 16 may be configured to store and/or retrieve data. For instance, a memory device of memory devices 16 may receive data and a message from controller 8 that instructs the memory device to store the data. Similarly, the memory device of memory devices 16 may receive a message from controller 8 that instructs the memory device to retrieve data. In another example, controller 8 may store cached information in volatile memory portions of memory 10 until the cached information is written to non-volatile memory portions of memory 10. The volatile memory may consume power received from power supply 11. In some examples, each of memory devices 16 may be referred to as a die. In some examples, a single physical chip may include a plurality of dies (i.e., a plurality of memory devices 16). In some examples, each of memory devices 16 may be configured to store relatively large amounts of data (e.g., 128 MB, 512 MB, 1 GB, 4 GB, 16 GB, 64 GB, 128 GB, 512 GB, 1 TB, etc.).

Memory 10 may include any type of volatile memory devices, including random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like)). Memory 10 may include any type of non-volatile memory devices. Some examples of memory 10 include, but are not limited to flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices. In other examples, memory 10 can include magnetic media, optical disks, floppy disks, flash memories, or forms of electrically programmable memories (EPROM) or electrically erasable and programmable memories (EEPROM). For example, memory devices 16 of memory 10 may be one or more magnetic platters in storage device 6, each platter containing one or more regions of one or more tracks of data.

Storage device 6 includes controller 8, which may manage one or more operations of storage device 6. For instance, controller 8 may manage the reading of data from and/or the writing of data to memory devices 16. Controller 8 may represent one of or a combination of one or more of a microprocessor, digital signal processor (DSP), application specific integrated circuit (ASIC), field programmable gate array (FPGA), or other digital logic circuitry.

Storage device 6 may include one or more internal sensors and modules configured to monitor the current state and operating conditions of storage device 6. In some examples, controller 8 is configured to generate and store operating statistics associated with an operating state of storage device 6. For example, controller 8 may generate operating statistics related to the internal temperature of the storage device 6 (e.g., "21.95° C.") based on signals obtained from a temperature sensor of storage device 6. In some examples, storage device 6 may include multiple temperature sensors, and controller 8 may generate operating statistics related to the internal temperature of a respective portion of storage device 6 (e.g., "21.95° C.") based on signals obtained from a respective temperature sensor. As another example, controller 8 may generate operating statistics related to the power usage of storage device 6 (e.g., "5.0 W") based on measurements from a power manager module executing in controller 8. As another example, controller 8 may generate operating statistics related to the endurance of storage device 6 (e.g., "10 GB/day for 8 years remaining" or "550 days remaining at the rated 10 drive write per day")) based on measurements from an endurance manager module executing in controller 8.

In some examples, host device 4 may be configured to transmit a non-interrupt command frame that requests transfer of data blocks between storage device 6 and host device 4. For example, host device 4 may transmit SCSI commands, via interface 14, to storage device 6 to read data from logical blocks in storage device 6 or write data to logical blocks within storage device 6.

In some examples, controller 8 of storage device 6 may be configured to, in response to receiving the non-interrupt command frame from host device 4, process and perform the requested operations received in the non-interrupt command frame. For example, controller 8 may add an instruction based on the non-interrupt command frame to a task queue, and a processor may perform the operation based on the position of the operation in the queue, priority associated with the operation, storage device resource calculations, or the like. In contrast to an interrupt command, a non-interrupt command may not be associated with a priority that is higher than all other pending commands in a queue. Upon performance of the requested operations, controller 8 may be configured to generate a response frame associated with the command frame. For example, upon completion of the requested operations, controller 8 may be configured to generate a response frame indicating completion of the requested operations. According to techniques of this disclosure, controller 8 may retrieve the generated operating statistics and embed the operating statistics within the response frame. Controller 8 may then transmit the response frame to host device 4.

Upon receiving the response frame, host device 4 may be configured to extract the operating statistics associated with the operating state of storage device 6 from the response frame. For example, host device 4 may extract the operating statistics from particular designated fields within the response frame. As such, host device 4 configured according to the described techniques is able to obtain the operating statistics during operation of storage device 6, even though host device 4 did not expressly send a log retrieval command to storage device 6.

Accordingly, techniques of the present disclosure enable a host device to receive drive operating statistics in real-time and without the performance impact that may occur with issuing dedicated log retrieval commands. For example, techniques of this disclosure can be used to obtain operating statistics on a frequent basis compared to other approaches without incurring performance costs proportionate to the frequency of obtaining the operating statistics. In examples in which the described techniques are implemented by extending an existing protocol, such as Serially-Attached SCSI, a host device may not need to be modified to support a vendor-unique mechanism or a proprietary interface for retrieving drive statistics, such as re-purposing one or more physical pins on a SAS connector connecting the host device to the storage device.

According to this disclosure, the described techniques provide a host device with controls to configure and customize the usage of the operating statistics. For example, a host device may dynamically adjust controls based on a system installation to support different reporting requirements on different systems. In examples having a system-level debug environment, the techniques of this disclosure enable real-time operating statistics that are customized to a specific problem under investigation. For example, the host device can provide an embedded operating statistics configuration that configures the storage device to provide only the temperature operating statistics to specifically debug an issue with the storage device overheating. Using the techniques of this disclosure, the host device may be configured to provide a custom trigger mechanism for interface analyzers (e.g., SAS Analyzer) or for host systems during a joint host/device debug session. For example, storage device 6 may be configured to insert a unique code or pattern in a response frame to replace the operating statistics when a specific problem under investigation occurs. A SAS Analyzer, executing on host device 4, may be configured to capture SAS traffic in response to detecting the unique code or pattern in the response frame.

Figure 2:
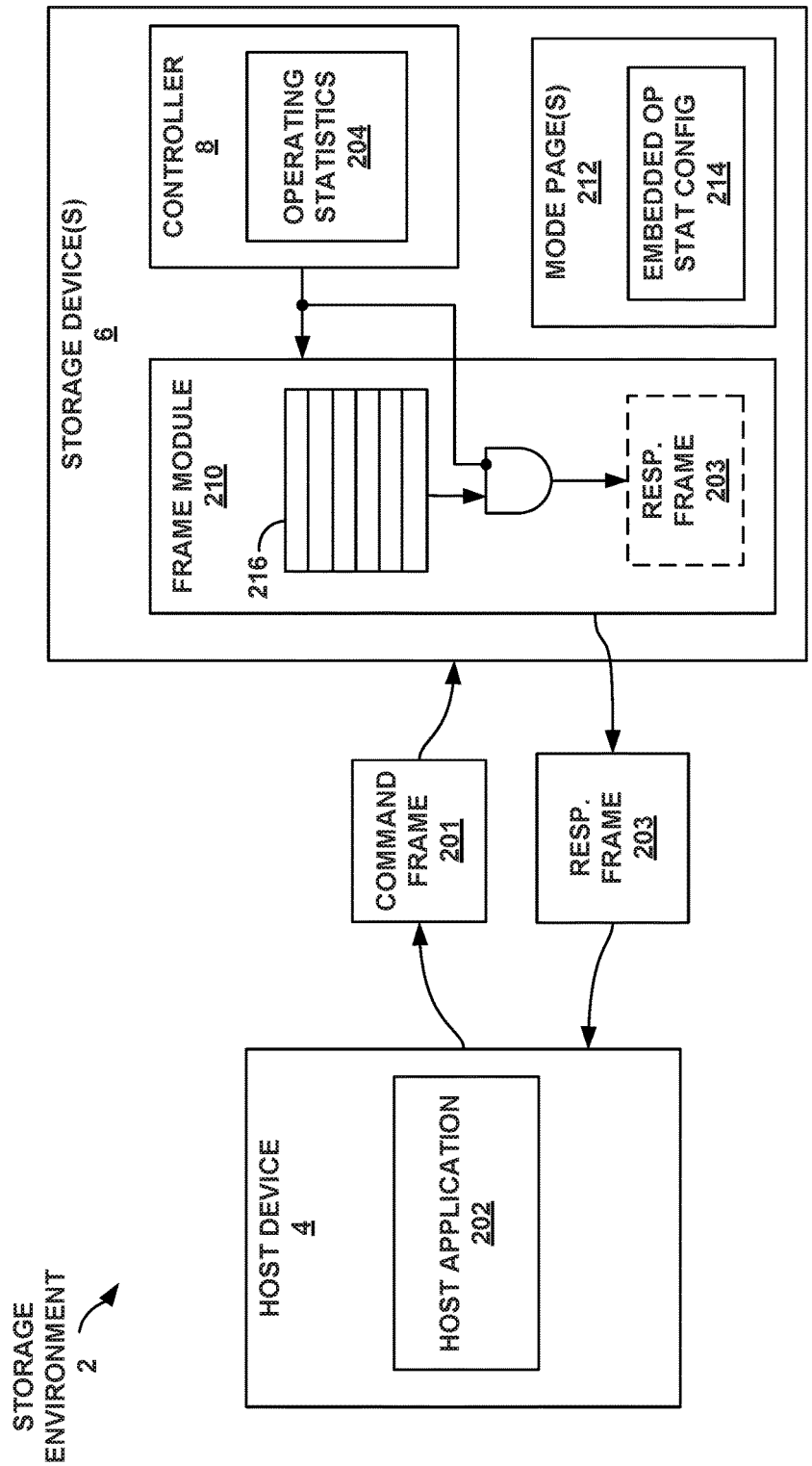
FIG. 2 is a conceptual and schematic block diagram illustrating an example storage environment in which a storage device may interact with a host device, in accordance with one or more techniques of this disclosure.

FIG. 2 is a conceptual and schematic block diagram illustrating an example storage environment 2 in which storage device 6 may interact with host device 4, in accordance with one or more techniques of this disclosure. FIG. 2 illustrates and describes conceptual and functional elements of FIG. 1, with concurrent reference to the physical components illustrated in FIG. 1.

Host device 4 (e.g., processors 24) may execute, among other modules not shown in FIG. 2, a host application 202 configured to interface with storage device 6. Host application 202 may be a software application (e.g., daemon, service) or software module (e.g., device driver), executing on host device 4 that handles communications with, configuration, and management of storage device 6. Host application 202 may transmit one or more non-interrupt command frames 201 that request the transfer of data blocks between storage device 6 and host device 4. For instance, in examples having a SAS interface, host application 202 may transmit a non-interrupt command frame containing a READ command that requests storage device 6 retrieve one or more specified logical blocks and return the user data associated with the one or more specified logical blocks (e.g., or transfer the data to a data-in buffer). In another example, host application 202 may transmit a non-interrupt command frame containing a WRITE command that requests storage device 6 write one or more specified logical blocks to memory 10 of storage device 6 (which may include a transfer of the specified logical blocks from a data-out buffer). In some examples, host application 202 may use other supporting non-interrupt commands and requests (i.e., beyond just READ and WRITE commands) that relate to the transfer of data blocks between storage device 6 and host device in non-interrupt command frames 201. For example, in a system using a SAS interface, host application 202 may transmit non-interrupt command frames 201 having a READ CAPACITY command that requests storage device 6 transfer parameter data describing the capacity of storage device 6, or having a VERIFY command that requests storage device 6 verify one or more specified logical blocks, and the like (e.g., SEEK, WRITE BUFFER). For the purposes of the present disclosure, log retrieval commands that expressly request for the retrieval of operating statistics maintained by a storage device (e.g., SCSI commands such as LOG SENSE) are not considered commands related to the transfer of data blocks between a storage device and a host device.

In some examples, storage device 6 may be configured to maintain operating statistics 204 which include statistical or other operational information related to the state of storage device 6 or various components of storage device 6. For example, operating statistics 204 maintained by storage device 6 may include temperature statistics indicating a current internal temperature of storage device 6 or of respective components of storage device 6, power statistics indicating the state of power consumption by storage device 6 or by respective components of storage device 6, and/or an endurance statistics indicating an estimated amount of read/write operations memory 10 of storage device 6 can perform (e.g., remaining program/erase cycles memory 10 can tolerate).

In some examples, storage device 6 may maintain operating statistics 204 indicating the state of one or more internal throttles that are associated with the operating statistics. The internal throttles are configured to limit performance or affect the behavior of storage device 6 with respect to the particular operating statistic. For example, storage device 6 may implement a temperature throttle that is actively engaged (i.e., having an "on" state) based on whether the current temperature exceeds a threshold temperature and that limits the rate of execution of operations by storage device 6 so as to reduce the temperature of storage device 6 or prevent the temperature from rising further.

In some examples, storage device 6 may be configured to maintain operating statistics 204 while storage device 6 may be under test (e.g., during a debug session). For example, storage device 6 may maintain operating statistics 204 having data related to the starting and stopping of or status of background operations related to memory devices 16 (e.g., background data refresh (BDR), read disturb, open/close bands, and logging). In some examples, storage device 6 may maintain operating statistics 204 having data related to the amount of or rate of error correction performed by storage device 6 on user data (e.g., on-the-fly (OTF) ECC corrections, moving read reference (MRR), XOR rebuilds). In one example, storage device 6 may maintain operating statistics 204 having data related to performance statistics, such as command counts, queue depth, and band validity statistics. In some examples, operating statistics 204 may be generated by, stored by, or collected by controller 8.

In some examples, storage device 6 may include a frame module 210 configured to generate one or more response frames in response to non-interrupt command requests received by storage device 6. In some examples, frame module 210 may be a hardware module (e.g., having circuitry configured to generate one or more response frames executing independently of firmware run by controller 8), firmware, or a combination of both. While frame module 210 is depicted in FIG. 2 as separate from controller 8, in some examples, frame module 210 may be a sub-module of controller 8.

In some examples, frame module 210 may include an auto-response buffer 216 which is configured to temporarily and atomically store elements of a response frame to facilitate assembly of a response frame 203. For example, controller 8 may store one or more generated operating statistics in auto-response buffer 216 for transmission to host device 4. In some examples, auto-response buffer 216 may be an interlocking mechanism that allows for atomic firmware updates to response frame content, thereby preventing cases of hardware populating response frames with partially updated information. In some implementations, auto-response buffer 216 may be comprised of one or more registers, SRAM, ancillary volatile memory (e.g., a portion of memory 10), or the like.

In some examples, operating statistics 204 may be arranged in a size and format suitable for fitting into one or more fields of a response frame 203. An example format for operating statistics 204 is provided in Table 1 below, although other formats may be used.

TABLE 1

Example Drive Operating Statistics

| Drive | Bit | | | | | | | |
|---|---|---|---|---|---|---|---|---|
| Operating Stat. | 7 | 6 | 5 | 4 | 3 | 2 | 1 | 0 |
| Temperature | Throttle | | Current Temperature (0-127° C.) | | | | | |
| Endurance | Throttle | | Percent Endurance Used (0-127%) | | | | | |
| Power | Throttle | | Current Power Used (0-32767 mW) | | | | | |

As shown in Table 1, operating statistics 204 may include fields for indicating the current temperature, the percentage of endurance used, and the current power used by the storage device, e.g., using single-byte or multi-byte fields. In some examples, operating statistics 204 may include a throttle sub-field for each field to indicate whether a corresponding internal throttle is actively engaged and limiting performance based on the associated parameter. In some implementations, operating statistics 204 are formatted to have a 4-byte representation that is sized to fit into one or more fields of a SAS response frame indicating Good Status.

In some examples, frame module 210 may be configured to generate response frames 203 for non-interrupt command frame 201. Response frames 203 may include information associated with performance by storage device 6 (e.g., controller 8) of the operation requested in received non-interrupt command frame 201, such as information that indicates completion of received non-interrupt command frames 201, and that include operating statistics 204. For example, in response to receiving and executing a WRITE SCSI command from host device 4, frame module 210 may generate a response frame 203 (sometimes also referred to as a response information unit (IU)) indicating storage device 6 has successfully completed the WRITE task. While a response frame is herein described in detail as a SCSI response frame, the techniques of the present disclosure can be extended to other formats and protocol messages.

According to techniques of the present disclosure, frame module 210 may embed operating statistics 204 into a designated field in response frames 203 based on the configuration specified by embedded operating statistics configuration field 214. In some examples, a response frame 203 may include a status field indicating a success or failure of a command, a data present field indicating the format and content of the response frame, and one or more available fields for embedding operating statistics 204. Example formats for a response frame 203 having operating statistics 204 is provided below in Table 2 and Table 3, although other similar formats may be used.

TABLE 2

Example Response Frame

| Good Response Frame offset | Byte 3 | Byte 2 | Byte 1 | Byte 0 |
|---|---|---|---|---|
| 0 | | Field1 | | |
| 4 | | Field2 | | |
| 8 | Status = GOOD (0) | DP = 0 | | Field3 |
| 12 | | Field4 | | |
| 16 | | Sense Data Length = 0 | | |
| 20 | | Response Data Length = 0 | | |

Table 2 depicts an example format for a response frame 203 having a status field at byte offset 11 indicating the successful completion of a command (e.g., a status code 00h), and a data present field at byte offset 10 indicating the present response frame does not have response data to return (e.g., 00b). The example response frame format of Table 2 includes 4-byte reserved fields located at frame offset 0, 4, and 12, one or more of which can be adapted to store operating statistics 204.

TABLE 3

Example Response Frame (with Response Data)

| Good Response Frame offset | Byte 3 | Byte 2 | Byte 1 | Byte 0 |
|---|---|---|---|---|
| 0 | | Field1 | | |
| 4 | | Field2 | | |
| 8 | Status = GOOD (0) | DP = 1 | | Field3 |
| 12 | | Field4 | | |
| 16 | | Sense Data Length = 0 | | |
| 20 | | Response Data Length = 8 | | |
| 24 | Response Code = 0x80 | | | Reserved |
| 28 | | Response Data | | |

Table 3 depicts another example format for a response frame 203 configured to embed an arbitrary amount of operating statistics 204 in a response frame 203, i.e., more than might otherwise fit in one of the reserved fields shown in the format of Table 2. In some examples, the response frame shown in Table 3 includes a data present field that indicates the present response frame includes one or more fields of response data appended at the end (e.g., DP=1), a response data length field indicating the length of the appended data (e.g., 8 bytes), a response code field indicating the appended data includes operating statistics related to the state of storage device 6, and operating statistics 204 embedded in a response data region (e.g., located at bytes 28-31).

Storage device 6 further includes one or more control mode pages 212 having a plurality of settings that affect various device behaviors of storage device 6. Host device 4 may transmit configuration information to storage device 6, which may result in the changes to control mode pages 212. For example, host device 4 may send a MODE SELECT command from host device 4 to modify configuration and parameters that affect the behavior of storage device 6.

In some examples, control mode pages 212 may include an embedded operating statistics configuration field 214 that controls how storage device 6 provides operating statistics in response frames 203. In some examples, embedded operating statistics configuration field 214 may store a value representing a designated field or location in response frames for inserting operating statistics 204. In another example, embedded operating statistics configuration field 214 may store a value representing a selection of one or more (or all of) operating statistics 204 maintained by storage device 6 are to be embedded in response frames 203.

In some implementations, embedded operating statistics configuration field may be a 3-bit field contained in a control mode page 212 having values from "0" to "7" that controls behavior of the operating statistics. For example, controller 8 may disable the operating statistics based on a configuration value of "0". Using the example format from Table 2, controller 8 may select at a first field ("Field1") located at bytes 0-4 for embedding operating statistics 204 based on embedded operating statistics configuration field 214 having a first designated value (e.g., "1"); select a second field ("Field2") located at bytes 4-7 based on a second designated value (e.g., "2"); or select a third field ("Field4") located at bytes 12-15 based on a third designated value (e.g., "3"). In another example, based on embedded operating statistics configuration field 214 having another designated value (e.g., "4"), controller 8 may insert operating statistics 204 in an arbitrary-length response data field in response frame 203, and configure the data present field and other fields accordingly as shown in Table 3.

According to examples of this disclosure, host application 202 may be configured to receive one or more response frames 203 from storage device 6 associated with command frames 201, such as information indicating completion and status of non-interrupt command frames 201. In some examples, host application 202 may extract operating statistics 204 from a location within response frame 203 as determined by embedded operating statistics configuration field 214. In some examples, host application 202 may store the extracted operating statistics 204 for later debugging and/or log analysis.

In some examples, host application 202 may be configured to retrieve operating state data from storage device 6 and modify configuration and behavior of storage device 6 in response to the operating state data. For example, based on temperature statistics obtained from response frame 203, host application 202 may adjust the cooling operations performed by storage device 6 or a system in which storage device 6 is incorporated. As another example, host application 202 may alter the power consumption limit or power supplied to storage device 6 based on the power statistics obtained from response frames 203. As another example, host application 202 may change and re-route workflow to another bank of drives (e.g., different set of memory devices 16 or another, separate storage device) based on power statistics obtained from response frames 203 from different storage devices indicating that the workload is not balanced across the storage devices. As another example, based on endurance statistics extracted from response frame 203, host application 202 may reduce write workloads on storage device 6 to balance remaining number of Program and Erase (P/E) cycles on storage device 6. In some examples, based on a throttle sub-field associated with an operating statistic (e.g., temperature, power, endurance) is actively engaged, host application 202 may modify the configuration of storage device 6 to relieve the conditions of the throttle and restore storage device 6 to maximum performance. For example, host application 202 may modify power consumption parameters of storage device 6 based on an indication extracted from response frame 203 that the power throttle of storage device 6 is actively engaged.

Figure 3:
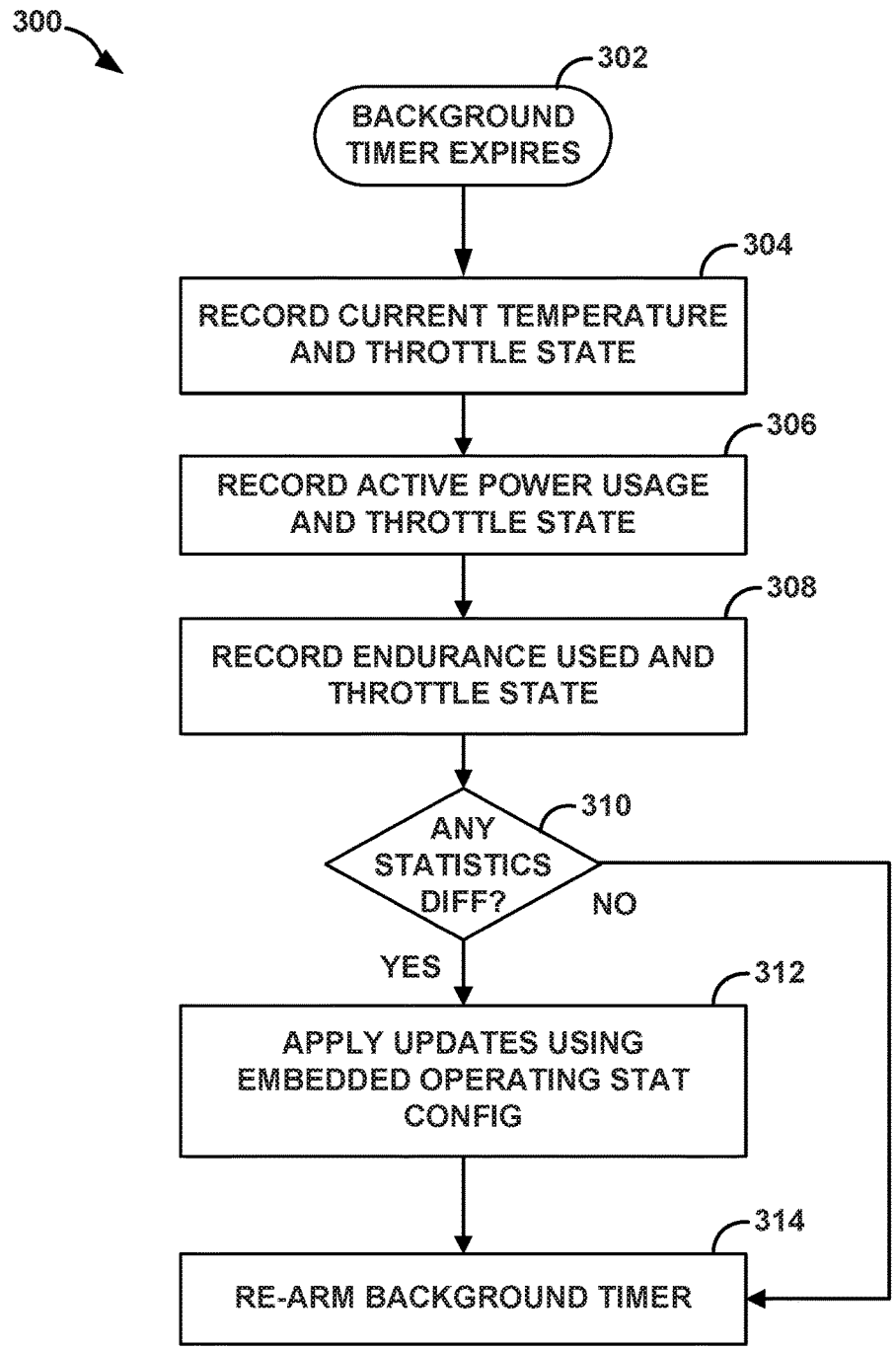
FIG. 3 is a flow diagram illustrating an example technique for generating operating statistics related to a current state of a storage device, in accordance with one or more techniques of this disclosure.

FIG. 3 is a flow diagram illustrating an example technique 300 for generating operating statistics related to a current state of a storage device, in accordance with one or more techniques of this disclosure. For ease of illustration, the technique of FIG. 3 will be described with concurrent reference to storage environment 2 of FIGS. 1 and 2. In one example, the technique of FIG. 3 may be performed by firmware executing on controller 8. However, the techniques may be used with any combination of hardware or software.

In some examples, a background timer executed by controller 8 expires (302). For example, controller 8 executes a background timer to periodically (e.g., 1-2 s) check whether updates need to be applied to drive operating statistics 204. In some examples, the operating statistics may have the same background timer, or use different corresponding background timers having a different durations. In some examples, responsive to expiry of the timer, controller 8 may gather one or more operating statistics from various modules and sensors within storage device 6.

In some examples, controller 8 may record a current temperature and throttle state (304). For example, controller 8 may determine a current temperature reading obtained from an internal temperature sensor of storage device 6. In another example, controller 8 may determine a current temperature measurement from a thermal manager module of storage device 6. Controller 8 may check whether the internal throttle associated with temperature has been actively engaged and is limiting performance of storage device 6.

In some examples, controller 8 may record an active power usage and throttle state (306). For example, controller 8 may determine an active power usage measurement based on signals from power supply 11 of storage device 6, and check whether an internal throttle associated with power has been actively engaged. In another example, controller 8 may receive an indication of an active power usage from a power governor of storage device 6.

In some examples, controller 8 may record the endurance used and throttle state (308). For example, controller 8 may receive an indication of an amount of endurance used by storage device 6 from an endurance manager module executing on storage device 6, and check whether the internal throttle associated with endurance has been actively engaged.

In some examples, controller 8 determines whether there are any differences between current operating statistics 204 and previous operating statistics (310). If not (e.g., "NO" branch in decision block 310), controller 8 may re-arm the background timer associated with the operating statistics (314). In alternative examples, controller 8 may be configured to provide operating statistics 204 regardless of whether the values of the statistics have changed. In such examples, controller 8 skip the determination made at 310 and proceed to 312.

Responsive to determining a change in one or more of operating statistics 204 (e.g., "YES" branch of decision block 310), controller 8 may apply the updates of operating statistics 204 based on embedded operating statistics configuration field 214 (312). Controller 8 may generate operating statistics 204 in a format sized to fit into one or more fields of a response frame 203, e.g., as shown in Table 1 above. In some examples, controller 8 may apply the updates of operating statistics 204 to one or more hardware registers and enable a hardware indication (e.g., bit) that signals an update request by firmware to atomically copy operating statistics 204 to auto-response buffer 216. In an alternative example, controller 8 may store updated values of operating statistics 204 in locations within auto-response buffer 216 corresponding to a field of a response frame 203 (e.g., at bytes 4-7) as specified by embedded operating statistics configuration field 214.

Figure 4:
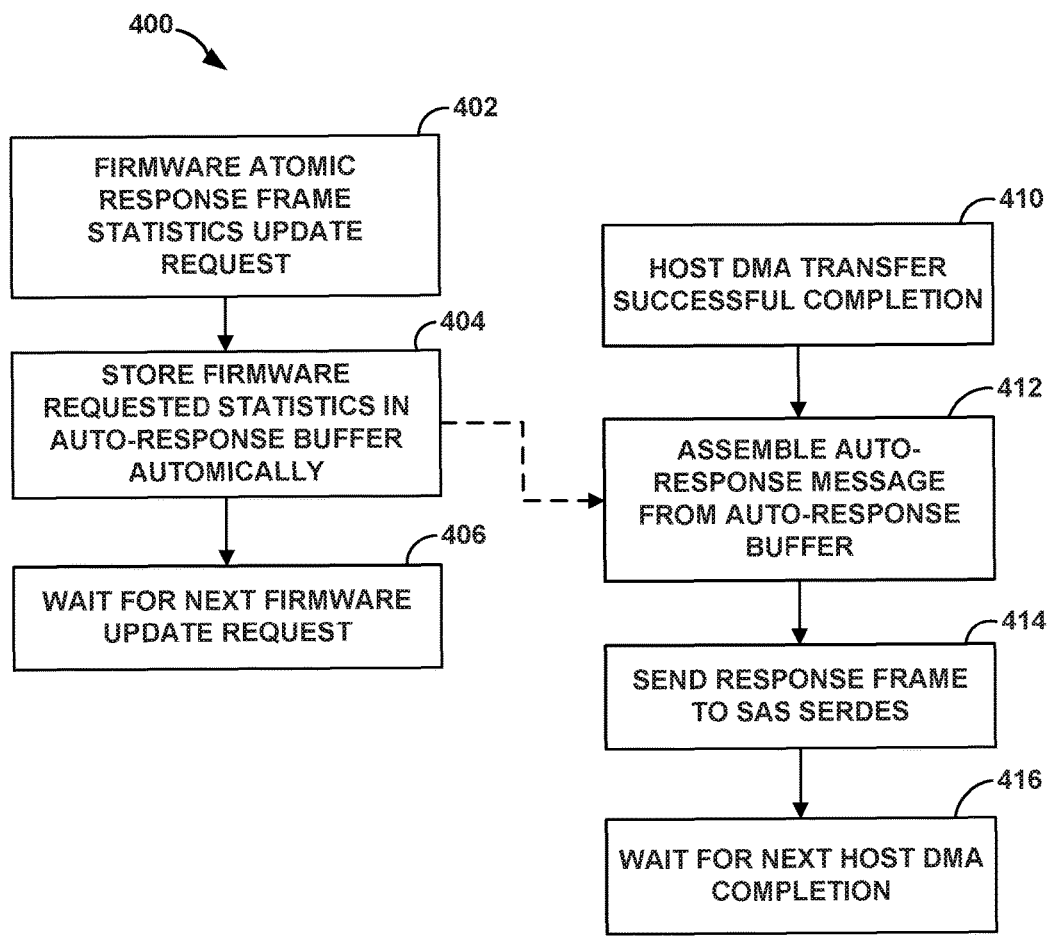
FIG. 4 is a flow diagram illustrating another example technique for embedding operating statistics in response frames, in accordance with one or more techniques of this disclosure.

FIG. 4 is a flow diagram illustrating another example technique 400 for embedding operating statistics in response frames, in accordance with one or more techniques of this disclosure. For ease of illustration, the technique of FIG. 4 will be described with concurrent reference to storage environment 2 of FIGS. 1 and 2. In some examples, technique 400 may be implemented by a hardware module such as frame module 210. However, the techniques may be used with any combination of hardware or software.

In some examples, frame module 210 of storage device 6 may detect a firmware request for an atomic update of response frame operating statistics (402). For example, frame module 210 may detect a hardware indication representing a request to copy updated operating statistics 204 from one or more internal hardware registers or ancillary volatile memory of controller 8 to auto-response buffer 216.

In some examples, frame module 210 may atomically store the requested operating statistics 204 in auto-response buffer 216 (404). In some examples, frame module 210 may copy operating statistics 204 from a hardware register to a location within auto-response buffer 216 based on embedded operating statistics configuration field 214. For example, frame module 210 may store operating statistics 204 in a location within auto-response buffer 216 corresponding to a second field ("Field2") located at bytes 5-7 of a response frame based on embedded operating statistics configuration field 214 having a particular designated value (e.g., "2"). Responsive to atomically storing the operating statistics in auto-response buffer 216, frame module 210 may be configured to wait for a next firmware update request (406).

In some examples, controller 8 may complete execution of a non-interrupt command frame 201 received from host device 4 (410). For example, controller 8 may successfully complete a host direct media access (DMA) transfer for one or more logical blocks of user data from storage device 6 to host device 4 in response to a READ command from host device 4.

In some examples, frame module 210 may assemble a response frame 203 using data stored in auto-response buffer 216 (412). For example, frame module 210 may retrieve data stored in auto-response buffer 216 and assemble a response frame 203 that includes operating statistics 204. In one implementation, frame module 210 may generate a response information unit (IU) formatted as a SAS response frame as shown in Table 2 or Table 3.

In some examples, frame module 210 may send the generated response frame 203 to a serializer-deserializer module of storage device 6, for transmission to host device 4 via interface 14 (414). The serializer-deserializer module, sometimes referred to as a "SerDes", may enable high-speed communications by converting data between serial data and parallel data for transmission between host device 4 and storage device 6. In some examples, frame module 210 may be configured to wait for a next indication of a completed command execution (416). For example, frame module 210 may wait for a next host DMA completion.

Figure 5:
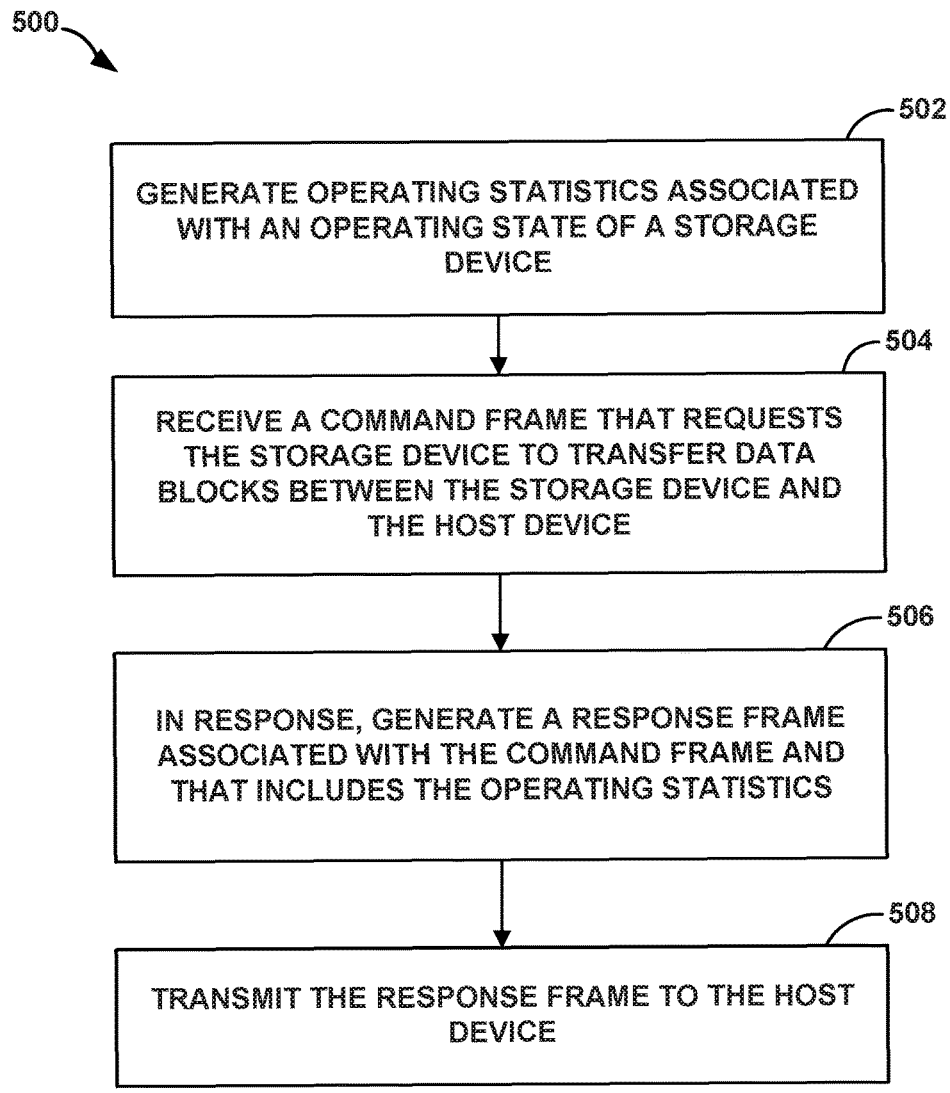
FIG. 5 is a flow diagram illustrating another example technique for providing operating statistics, in accordance with one or more techniques of this disclosure.

FIG. 5 is a flow diagram illustrating another example technique 500 for providing operating statistics, in accordance with one or more techniques of this disclosure. For ease of illustration, the technique of FIG. 5 will be described with concurrent reference to storage environment 2 of FIGS. 1 and 2. The techniques may be used with any combination of hardware or software.

In some examples, controller 8 may generate operating statistics 204 associated with an operating state of the storage device 6 (502). For example, operating statistics 204 associated with the operating state of storage device 6 may include at least one of a temperature statistic, a power statistic, and an endurance statistic associated with the storage device. In one example, operating statistics 204 may include an indication that the storage device has actively engaged a corresponding internal throttle associated with the operating statistics and has limited performance of the storage device. In some examples, controller 8 may determine updated values of operating statistics 204 based on a comparison with prior values of the operating statistics.

In some examples, controller 8 may receive configuration information from host device 4 and modify an embedded operating statistics configuration field 214 in a control mode page 212 of storage device 6. For example, controller 8 may receive a MODE SELECT command from host device 4 containing configuration information for embedded operating statistics configuration field 214. Embedded operating statistics configuration field 214 may specify a location in the response frame for inserting the operating statistics.

In some examples, controller 8 may receive, from a host device 4, a non-interrupt command frame 201 that requests transfer of data blocks between storage device 6 and host device 4 (504). In some examples, non-interrupt command frame 201 may contain a SAS command related to transfer of logical data blocks between the devices. For example, non-interrupt command frame 201 may be a read command requesting transfer of data blocks from storage device 6 to host device 4. In another example, non-interrupt command frame 201 may be a write command requesting transfer of data blocks from host device 4 to storage device 6. In another example, non-interrupt command frame 201 does not include an explicit log retrieval command for the operating statistics and is not an interrupt.

In some examples, in response to receiving non-interrupt command frame 201, controller 8 may generate a response frame 203 associated with the non-interrupt command frame 201 and including operating statistics 204 (506). In some examples, controller 8 may determine updated values of the operating statistics based on a comparison with prior values of the operating statistics. In some examples, controller 8 may generate response frame 203 including operating statistics 204 in response to determining that the operating statistics have been updated based on a comparison with prior operating statistics. In some examples, controller 8 may generate response frame 203 based on embedded operating statistics configuration field 214. Controller 8 may configure a data present field of response frame 203 to indicate that response frame 203 contains response data, and may append operating statistics 204 to response frame 203 as response data. In some examples, controller 8 may transmit response frame 203 to host device 4 (508).

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
    transmitting, by a host device and to a storage device, a non-interrupt command frame that requests transfer of data blocks between the storage device and the host device;
    receiving, by the host device and from the storage device, a response frame associated with the non-interrupt command frame;
    extracting, by the host device, operating statistics associated with an operating state of the storage device embedded in the response frame; and
    transmitting, by the host device and to the storage device, configuration information specifying a location in the response frame for inserting the operating statistics;
    wherein extracting the operating statistics associated with the operating state of the storage device embedded in the response frame is extracted based on the configuration information.

2. The method of claim 1, wherein the operating statistics associated with the operating state of the storage device include at least one of a temperature statistic, a power statistic, and an endurance statistic associated with the storage device.

3. The method of claim 1, wherein the non-interrupt command frame includes a read command or a write command and does not include a log retrieval command for the operating statistics.

4. A method comprising:
    generating, by a controller of a storage device, operating statistics associated with an operating state of the storage device;
    receiving, by the controller and from a host device, a non-interrupt command frame that requests transfer of data blocks between the storage device and the host device;
    in response to receiving the non-interrupt command frame, generating, by the controller, a response frame associated with the non-interrupt command frame, wherein the response frame includes the operating statistics;
    transmitting, by the controller and to the host device, the response frame; and
    in response to configuration information received from the host device, modifying, by the controller, an embedded operating statistics configuration field in a control mode page of the storage device, wherein the embedded operating statistics configuration field specifies a location in the response frame for inserting the operating statistics,
    wherein the generated response frame is generated based on the embedded operating statistics configuration field.

5. The method of claim 4, wherein generating the operating statistics comprises:
    determining, by the controller, updated values of the operating statistics based on a comparison with prior values of the operating statistics.

6. The method of claim 5, wherein generating the response frame including the operating statistics is performed in response to determining that the operating statistics have been updated.

7. The method of claim 4, wherein generating the response frame further comprises:
    configuring, by the controller, a data present field of the response frame to indicate the response frame contains response data; and
    appending, by the controller, the operating statistics to the response frame as response data.

8. The method of claim 4, wherein the operating statistics include an indication that the storage device has actively engaged a corresponding internal throttle associated with the operating statistics that has limited performance of the storage device.

9. The method of claim 4, wherein the operating statistics associated with the operating state of the storage device include at least one of a temperature statistic, a power statistic, and an endurance statistic associated with the storage device.

10. The method of claim 4, wherein the non-interrupt command frame includes a read command or a write command and does not include a log retrieval command for the operating statistics.

11. A storage device comprising:
    a memory device; and
    a controller configured to:
        generate operating statistics associated with an operating state of the storage device;
        receive; from a host device, a non-interrupt command frame that requests transfer of data blocks between the storage device and the host device;
        in response to receiving the non-interrupt command frame, generate a response frame associated with the non-interrupt command frame, wherein the response frame includes the operating statistics;
        transmit, to the host device, the response frame; and
        in response to configuration information received from the host device, modify an embedded operating statistics configuration field in a control mode page of the storage device, wherein the embedded operating statistics configuration field specifies a location in the response frame for inserting the operating statistics,
    wherein the generated response frame is generated based on the embedded operating statistics configuration field.

12. The storage device of claim 11, wherein the controller is configured to generate the response frame including the operating statistics in response to a determination that the operating statistics have been updated.

13. The storage device of claim 11, wherein:
the controller comprises an auto-response buffer configured to atomically store the generated operating statistics; and
wherein the controller configured to generate the response frame is further configured to assemble the response frame based on contents of the auto-response buffer.

14. The storage device of claim 11, wherein the controller configured to generate the response frame is further configured to:
configure a data present field of the response frame to indicate the response frame contains response data; and
append the operating statistics to the response frame as response data.

15. The storage device of claim 11, wherein the operating statistics include an indication that the storage device has actively engaged a corresponding internal throttle associated with the operating statistics that has limited performance of the storage device.

16. The storage device of claim 11, wherein the operating statistics associated with the operating state of the storage device include at least one of a temperature statistic, a power statistic, and an endurance statistic associated with the storage device.

17. The storage device of claim 11, wherein the non-interrupt command frame includes a read command or a write command and does not include a log retrieval command for the operating statistics.

* * * * *